United States Patent
Boivin et al.

(10) Patent No.: US 6,874,586 B2
(45) Date of Patent: Apr. 5, 2005

(54) TRACK ASSEMBLY FOR AN ALL-TERRAIN VEHICLE

(75) Inventors: Denis Boivin, Beaumont (CA); Alain Boivin, St-Henri de Lévis (CA)

(73) Assignee: A & D Boivin Design Inc., Lévis (CA)

( * ) Notice: Subject to any disclaimer, the term of this patent is extended or adjusted under 35 U.S.C. 154(b) by 20 days.

(21) Appl. No.: 10/165,707

(22) Filed: Jun. 6, 2002

(65) Prior Publication Data

US 2003/0159860 A1 Aug. 28, 2003

Related U.S. Application Data

(63) Continuation-in-part of application No. 10/087,103, filed on Feb. 27, 2002, now abandoned.

(51) Int. Cl.[7] ............................................. B62D 55/04
(52) U.S. Cl. ................................................ 180/9.26
(58) Field of Search .......................... 180/9.25, 9.26, 180/9.21; 305/178, 135, 153, 154, 151, 165, 115, 199

(56) References Cited

U.S. PATENT DOCUMENTS

| | | | | |
|---|---|---|---|---|
| 916,601 A | * | 3/1909 | James | 305/124 |
| 1,031,174 A | * | 7/1912 | Fregoso | 305/126 |
| 1,038,569 A | * | 9/1912 | Grover | 180/185 |
| 1,062,318 A | * | 5/1913 | Berlin | 280/28.5 |
| 1,117,640 A | * | 11/1914 | Coon | 305/196 |
| 1,228,687 A | * | 6/1917 | Miller | 305/126 |
| 1,453,782 A | * | 5/1923 | Thomas | 305/126 |
| 1,774,835 A | * | 9/1930 | Lombard | 305/15 |
| 2,461,850 A | * | 2/1949 | Slemmons | 305/126 |
| 2,467,947 A | * | 4/1949 | Skelton | 180/9.5 |
| 2,496,136 A | * | 1/1950 | Smith | 305/139 |
| 3,590,935 A | * | 7/1971 | Celia | 180/9.5 |
| 3,598,454 A | * | 8/1971 | Richards | 305/133 |
| 3,688,858 A | * | 9/1972 | Jespersen | 180/9.62 |
| 3,841,424 A | * | 10/1974 | Purcell et al. | 180/9.5 |
| 3,894,778 A | * | 7/1975 | Siorek et al. | 305/125 |
| 3,938,606 A | * | 2/1976 | Yancey | 180/9.5 |
| 4,194,584 A | | 3/1980 | Kress et al. | 180/9.24 |
| 4,232,753 A | | 11/1980 | Carlson | 180/9.2 |
| 4,483,407 A | | 11/1984 | Iwamoto et al. | 180/9.5 |
| 4,714,302 A | * | 12/1987 | Svensson et al. | 305/179 |
| 5,340,205 A | * | 8/1994 | Nagorcka | 305/132 |
| 5,474,146 A | | 12/1995 | Yoshioka et al. | 180/184 |
| 5,515,936 A | | 5/1996 | Lagace | 180/9.1 |
| 5,607,210 A | | 3/1997 | Brazier | 305/131 |
| 5,655,615 A | | 8/1997 | Mick | 180/24.02 |
| 5,954,148 A | | 9/1999 | Okumura et al. | 180/9.21 |
| 6,006,847 A | | 12/1999 | Knight | 180/9.26 |
| 6,095,275 A | | 8/2000 | Shaw | 180/185 |
| 6,129,426 A | * | 10/2000 | Tucker | 305/136 |
| 6,132,287 A | | 10/2000 | Kuralt et al. | 446/433 |
| 6,199,646 B1 | | 3/2001 | Tani et al. | 180/9.21 |
| 6,626,258 B1 | * | 9/2003 | Forbes | 180/184 |

* cited by examiner

*Primary Examiner*—Lesley D. Morris
*Assistant Examiner*—Paul Royal
(74) *Attorney, Agent, or Firm*—Ogilvy Renault

(57) ABSTRACT

The present invention is concerned with track assemblies for an all-terrain vehicle, which make it maneuverable and effective upon a variety of unstable, uneven, stable and even surfaces, while designed to maintain tension upon the endless track belts to keep them in their due course and prevent accidental loosening while having a punctually localized surface contact with a ground surface, and at the same time reducing the damages inflicted on the terrain.

12 Claims, 10 Drawing Sheets

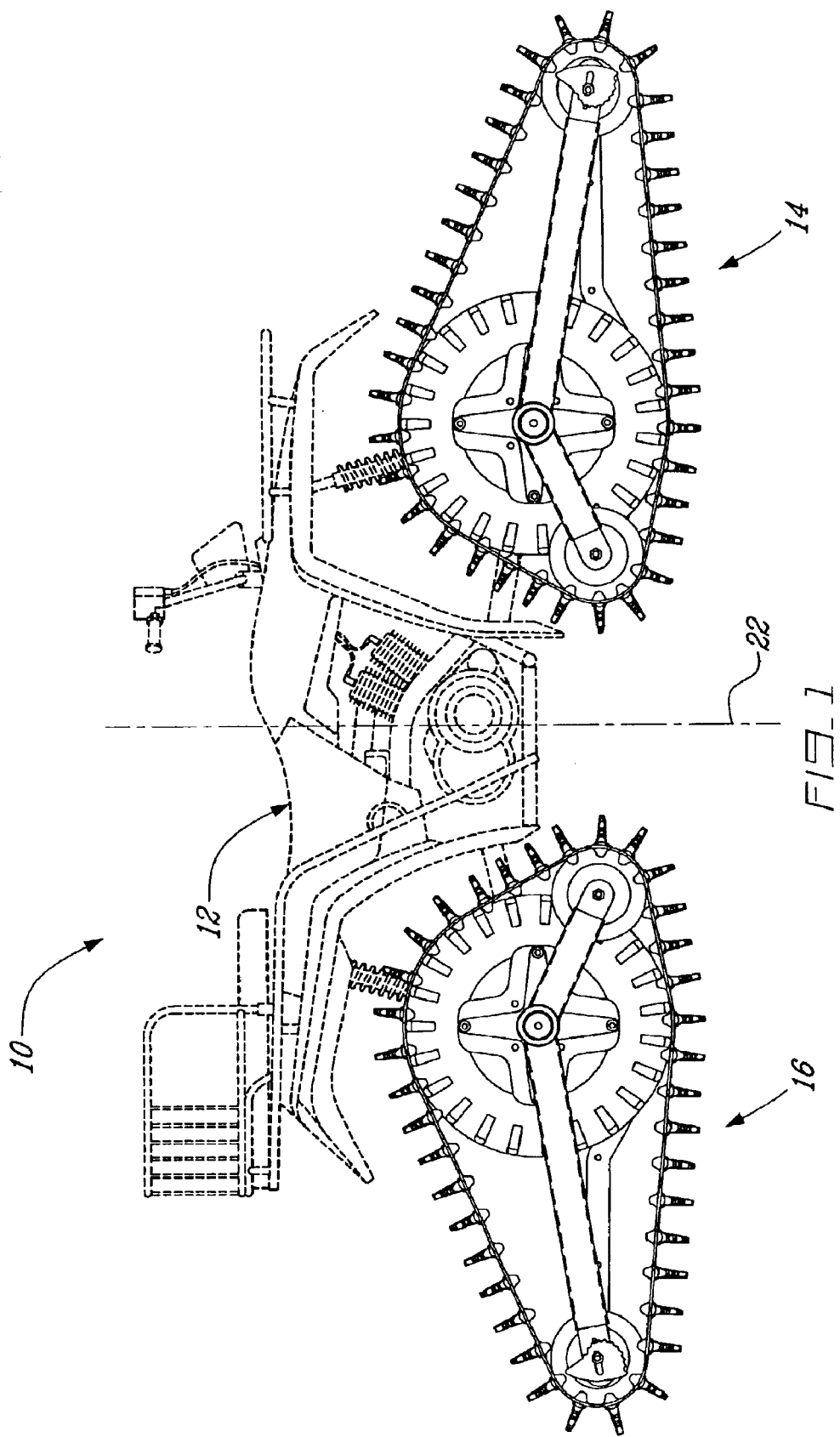

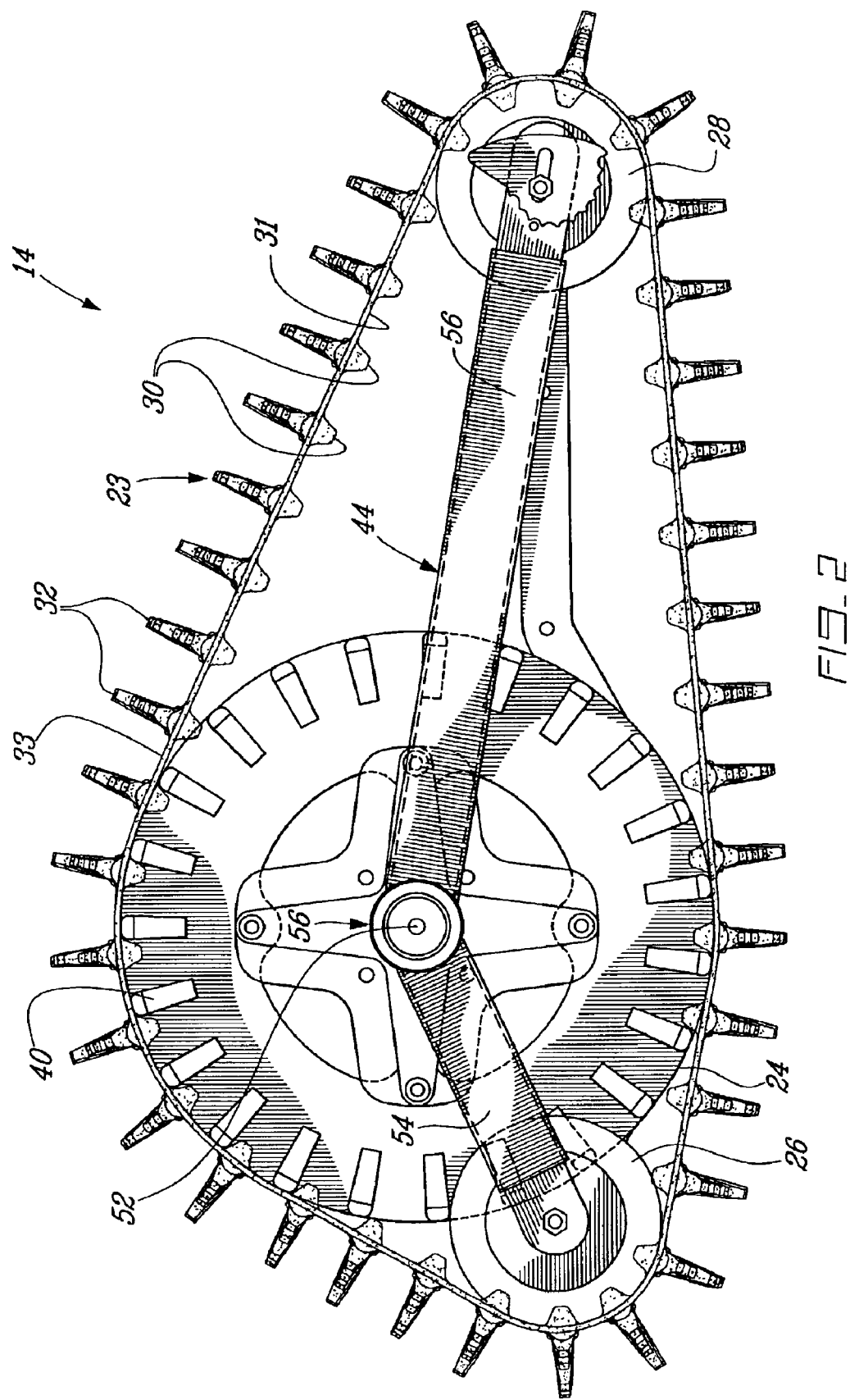

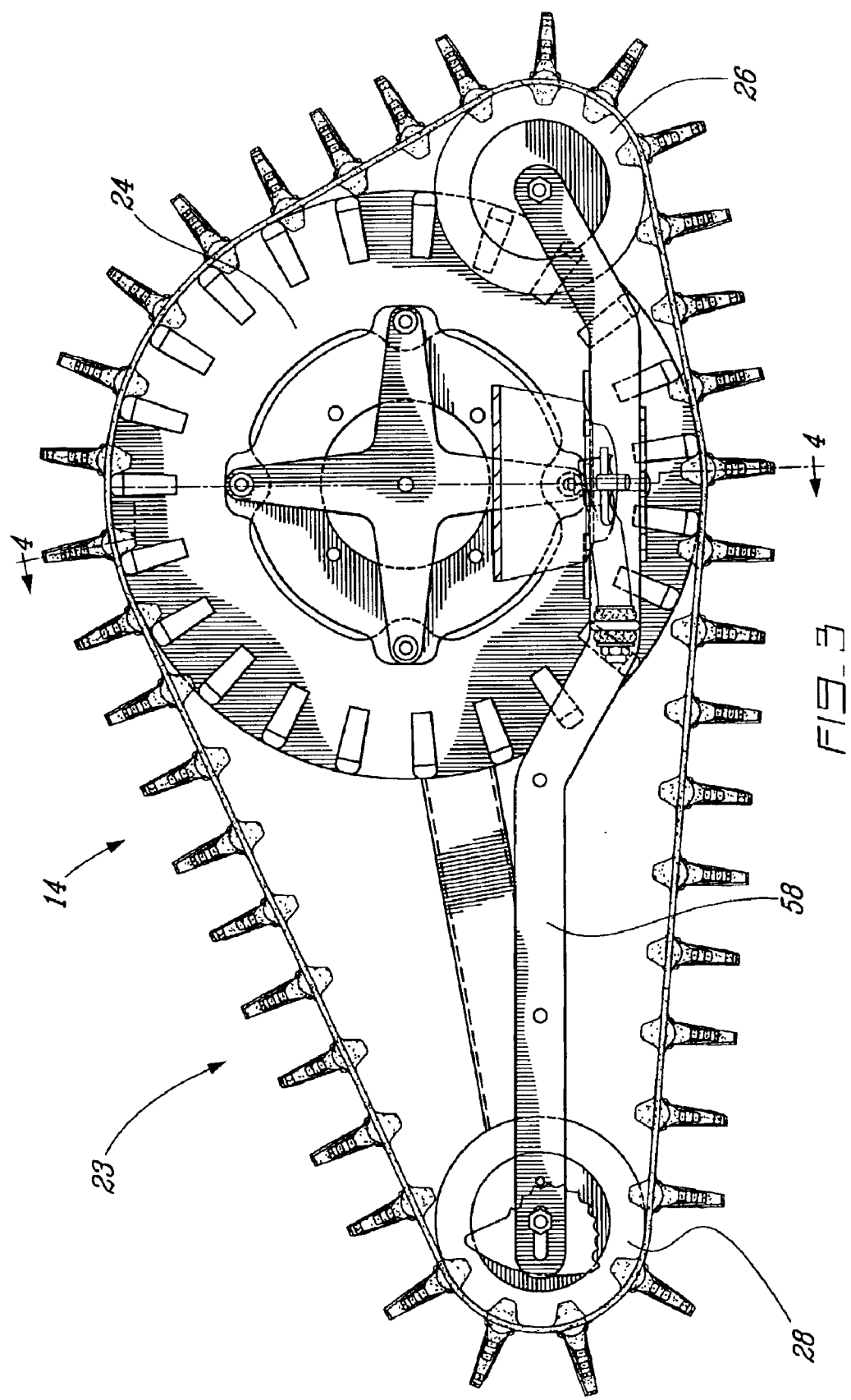
FIG_3

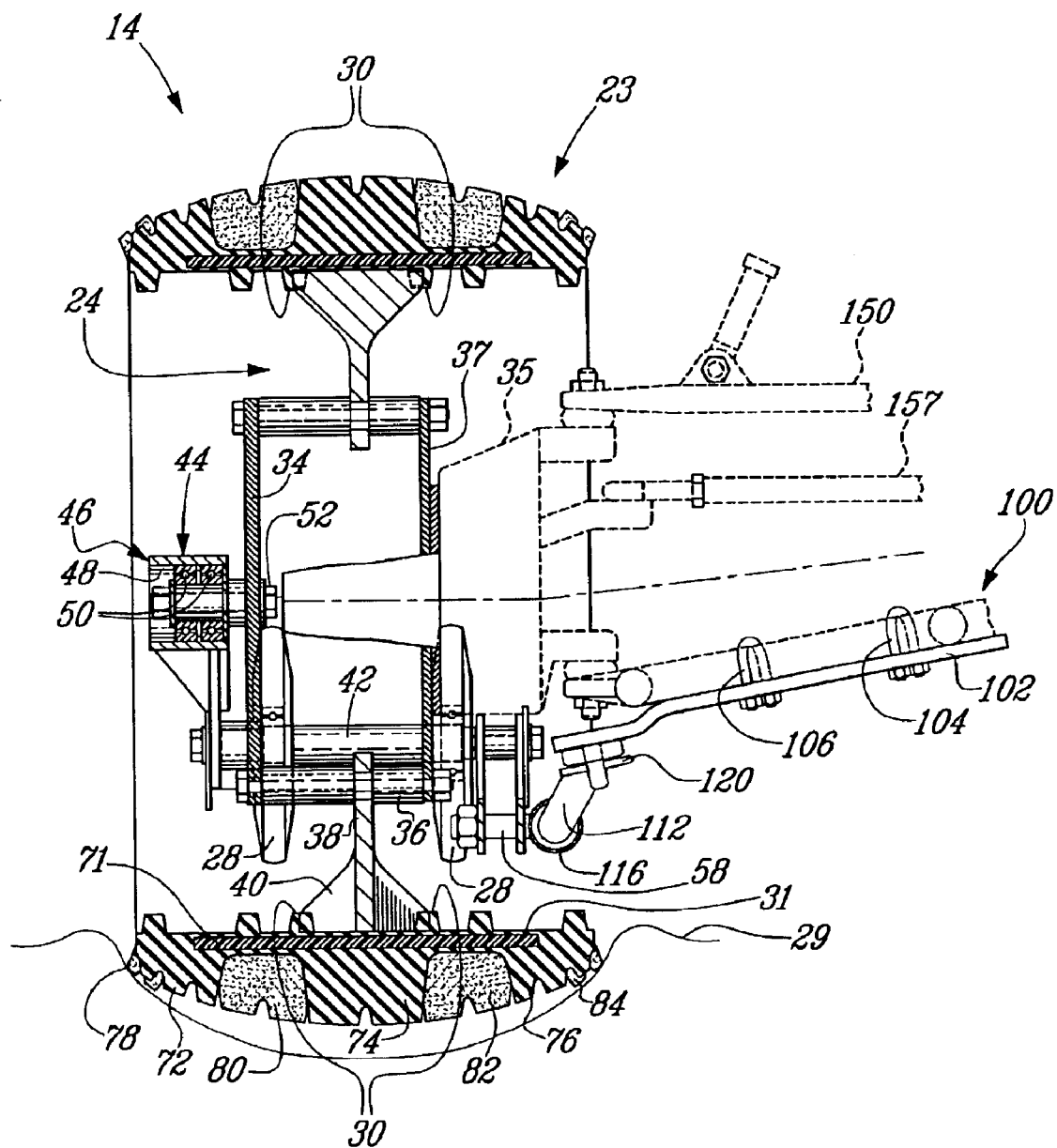
FIG_4

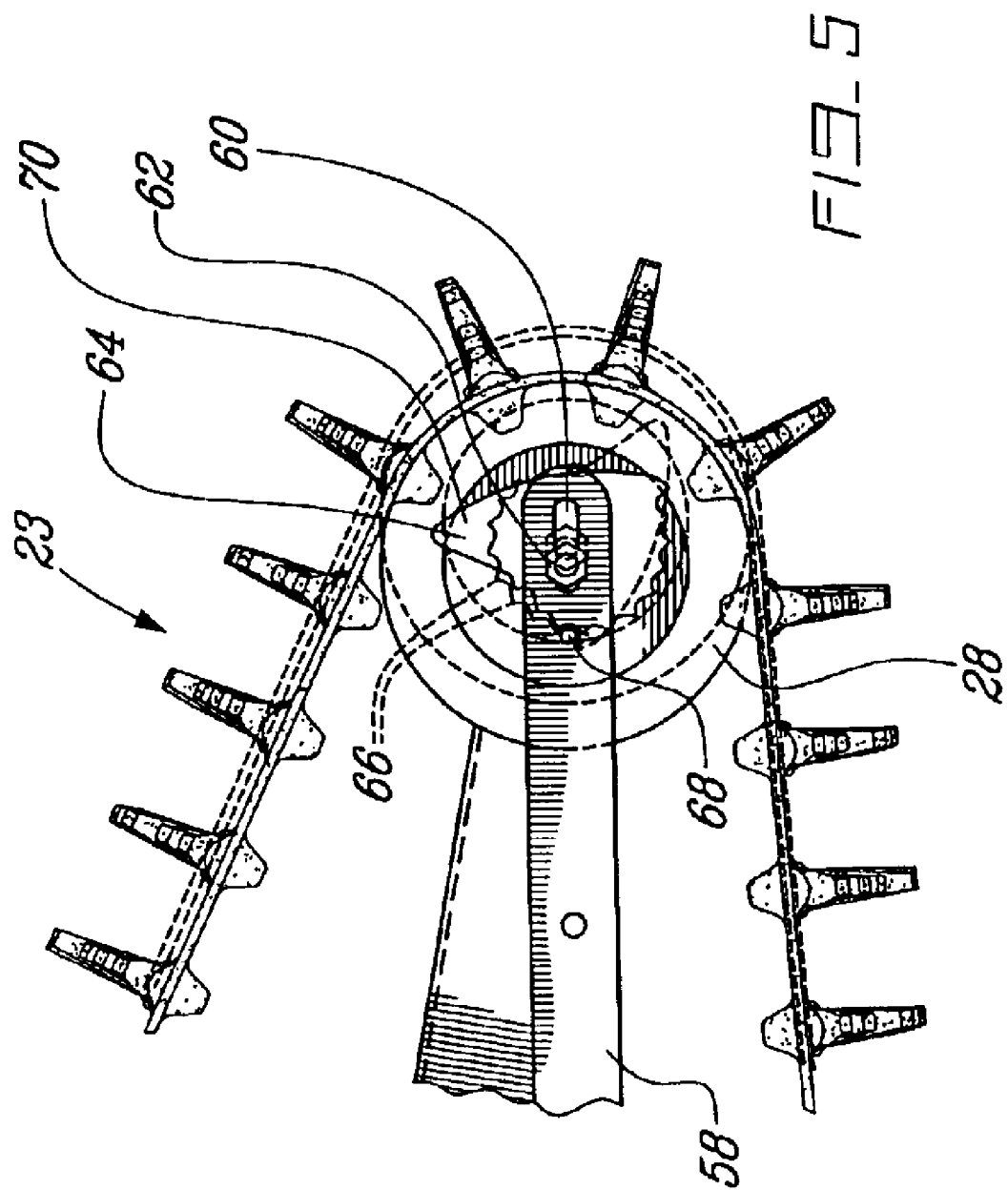

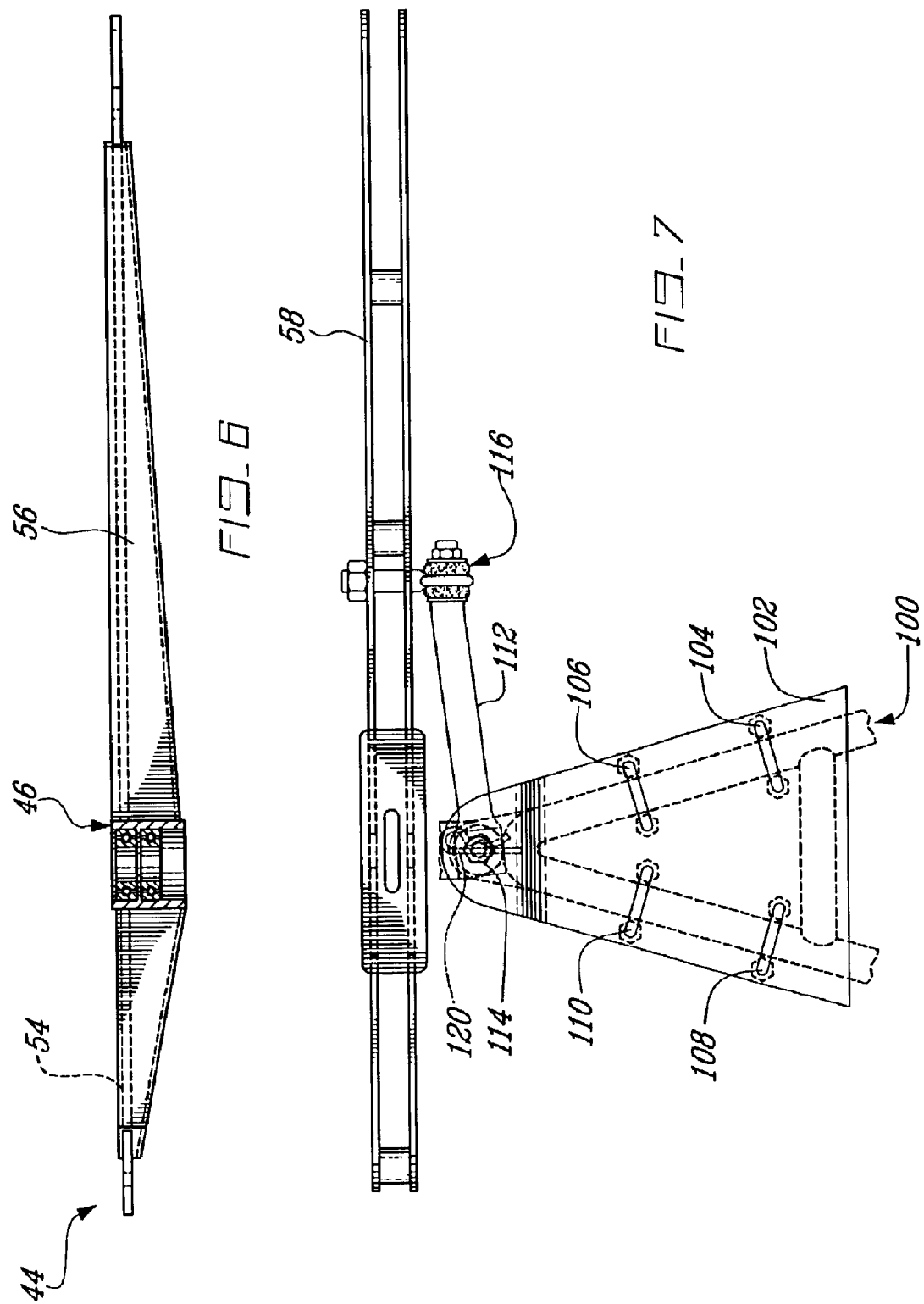

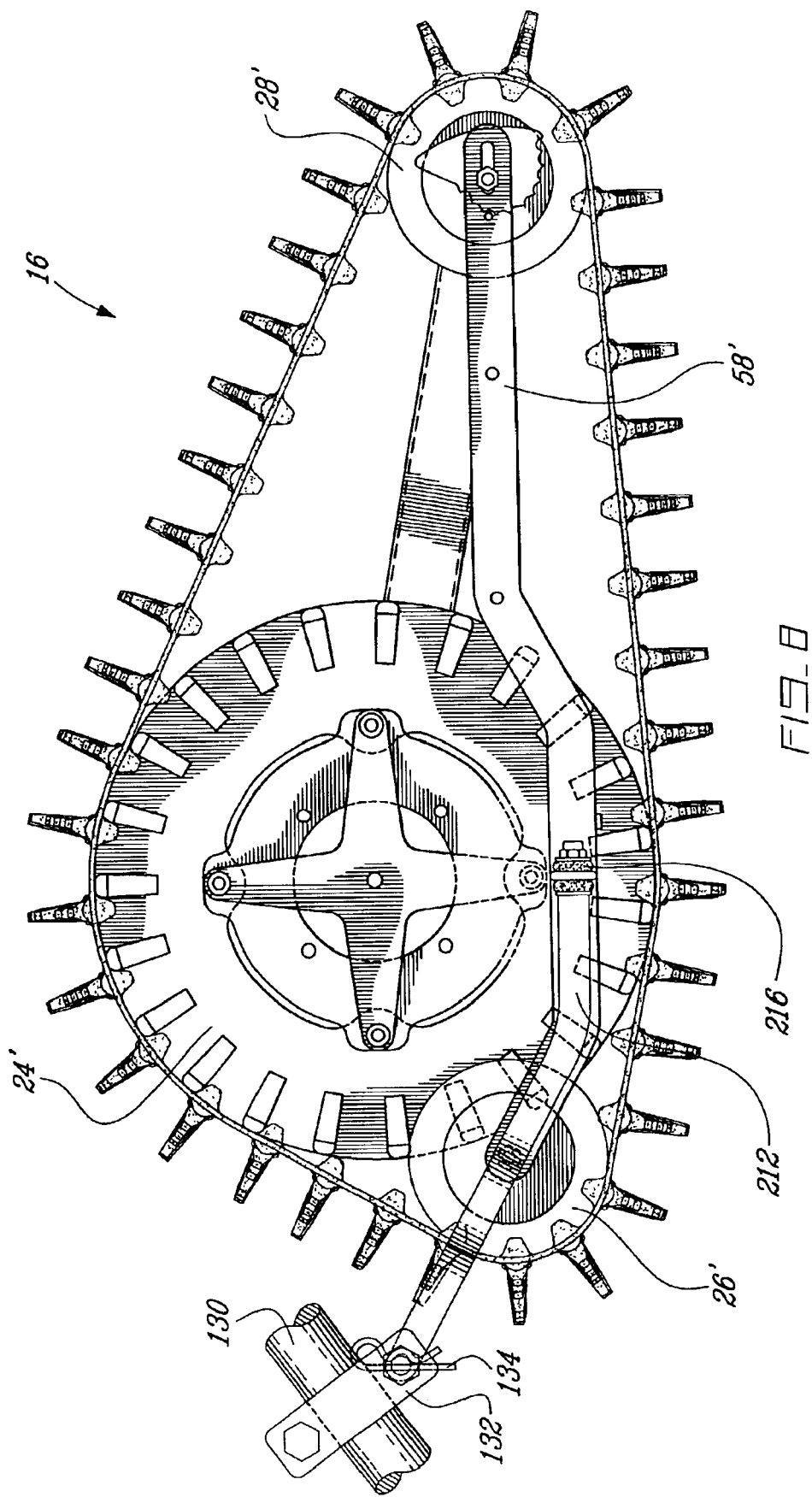

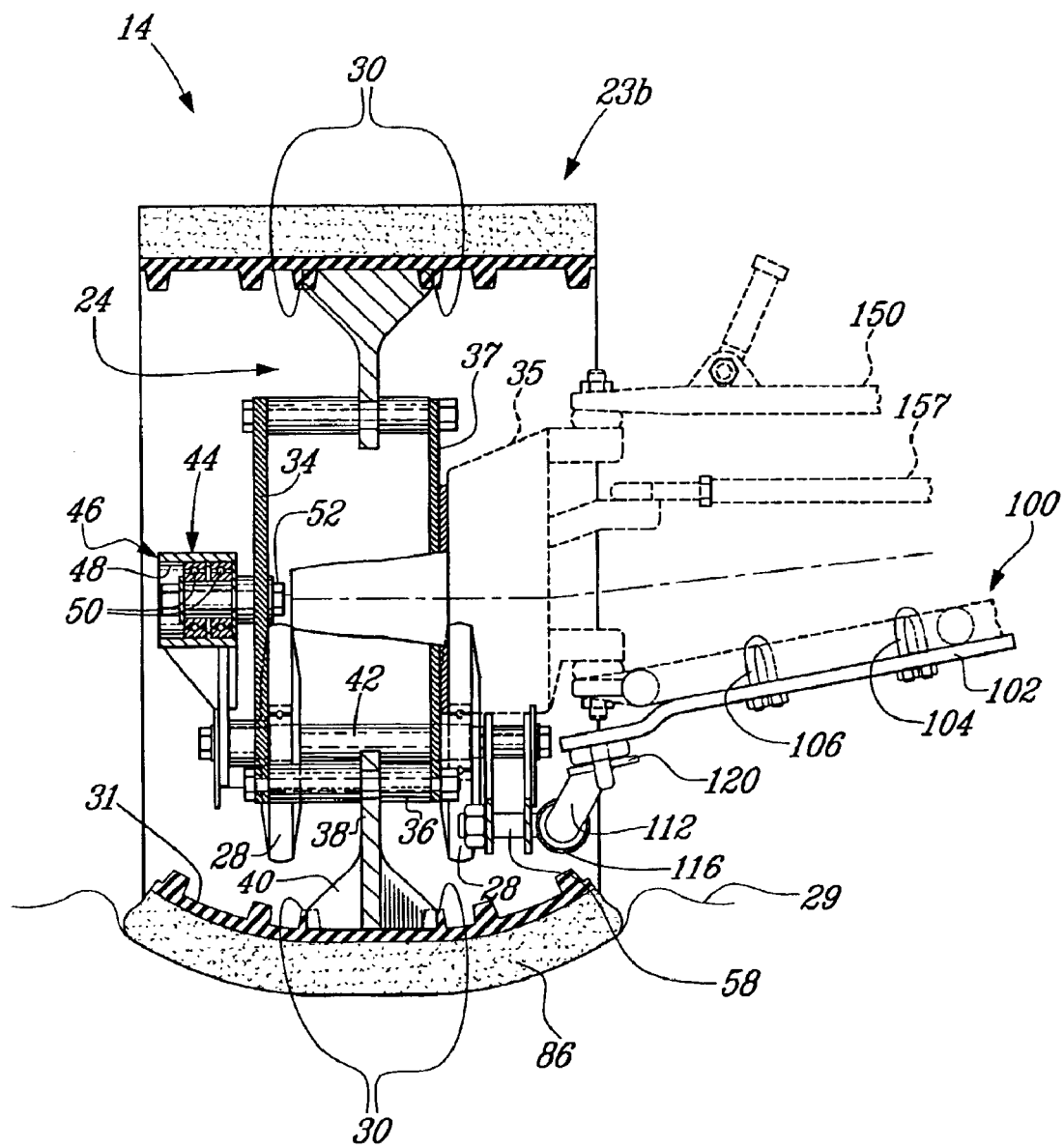
FIG_11

TRACK ASSEMBLY FOR AN ALL-TERRAIN VEHICLE

This application is a continuation-in-part of Ser. No. 10/087,103, filed Feb. 27, 2002, now abandoned.

FIELD OF THE INVENTION

The present invention relates to all-terrain vehicles. More specifically, the present invention is concerned with track assemblies for an all-terrain vehicle.

BACKGROUND OF THE INVENTION

Traditionally, two types of all-terrain vehicles are proposed either the wheel type or the tracked type.

Generally, a wheeled vehicle is more maneuverable than a tracked vehicle, but is not as efficient on uneven or soft terrain such as, for example snow.

Tracked all-terrain vehicles have been proposed, which require complicated track assemblies comprising a track frame to maintain the tension of the endless track belt and prevent it from loosening. Furthermore, such vehicles have generally a large contact area with the ground, which results in a decreased maneuverability and an increased impact on the often soft terrain.

Therefore, there is still room for improvements toward an all-terrain vehicle provided with track assemblies, which is maneuverable and effective upon a variety of unstable or uneven surfaces, while designed to maintain tension upon the endless track belts to keep them in their due course and prevent accidental loosening, and at the same time reducing the damages inflicted on the terrain.

OBJECTS OF THE INVENTION

An object of the present invention is therefore to provide improved track assemblies for an all-terrain vehicle.

SUMMARY OF THE INVENTION

More specifically, in accordance with the present invention, there is provided an all-terrain vehicle comprising at least two track assemblies to support the all-terrain vehicle onto a ground surface, each one of said at least two track assemblies comprising:

a longitudinal endless track belt provided with an inner surface provided with a plurality of inner lugs and an outer surface provided with a plurality of external lugs;

a mounting structure to mount said longitudinal endless track belt to said vehicle, wherein, when mounted to said mounting structure, said longitudinal endless track belt has a punctually localized surface contact with the ground surface.

In accordance with another aspect of the present invention, there is provided an endless track belt assembly comprising:

a track driving wheel provided with a plurality of teeth;

an endless track belt provided with an inner surface having a plurality of inner lugs and an outer surface having a plurality of external lugs, said endless track belt being wounded around said track driving wheel;

wherein a) said teeth are so spaced that a distance between two consecutive teeth spans a distance separating two consecutive inner lugs of said endless track belt and b) said endless track belt, when mounted to said track riving wheel, has a punctually localized contact with a ground surface.

In accordance with another aspect of the present invention, there is provided a method for mounting an endless track belt on a all-terrain vehicle, comprising the acts of:

providing an endless track belt having inner lugs and external lugs;

providing a track driving wheel having a plurality of teeth so spaced that a distance between two consecutive of the plurality of teeth spans a distance separating two consecutive of a plurality of inner lugs of the endless track belt;

interconnecting the track driving wheel to an inside idler wheel and to an outside idler wheel; and tensioning the endless track belt around the track driving wheel, the inside idler wheel and the outside idler wheel so that the endless track belt has a punctually localized surface contact with a ground surface.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 1 is a side elevational view of an all-terrain vehicle provided with track assemblies according to an embodiment of the present invention;

FIG. 2 is a side elevational view of the front track assembly of the vehicle of FIG. 1, seen from of the outside of the all-terrain vehicle;

FIG. 3 is a side elevational view of the front track assembly of the vehicle of FIG. 1, seen form the inside of the all-terrain vehicle;

FIG. 4 is a sectional view taken along the line 4—4 of FIG. 3;

FIG. 5 is an enlarged side view of an outside idler wheel attachment of the track assembly of FIG. 2;

FIG. 6 is a sectional view of a rigid member of the track assembly of FIG. 2;

FIG. 7 is a top plan view of the attachment of the front track assembly of FIG. 1 to the all-terrain vehicle;

FIG. 8 is a side elevational view of a rear track assembly of FIG. 1, seen from the inside of the all-terrain vehicle;

FIG. 11 is a sectional view similar to FIG. 4 but illustrating a third type of endless track.

DESCRIPTION OF THE EMBODIMENT

Figure 9:
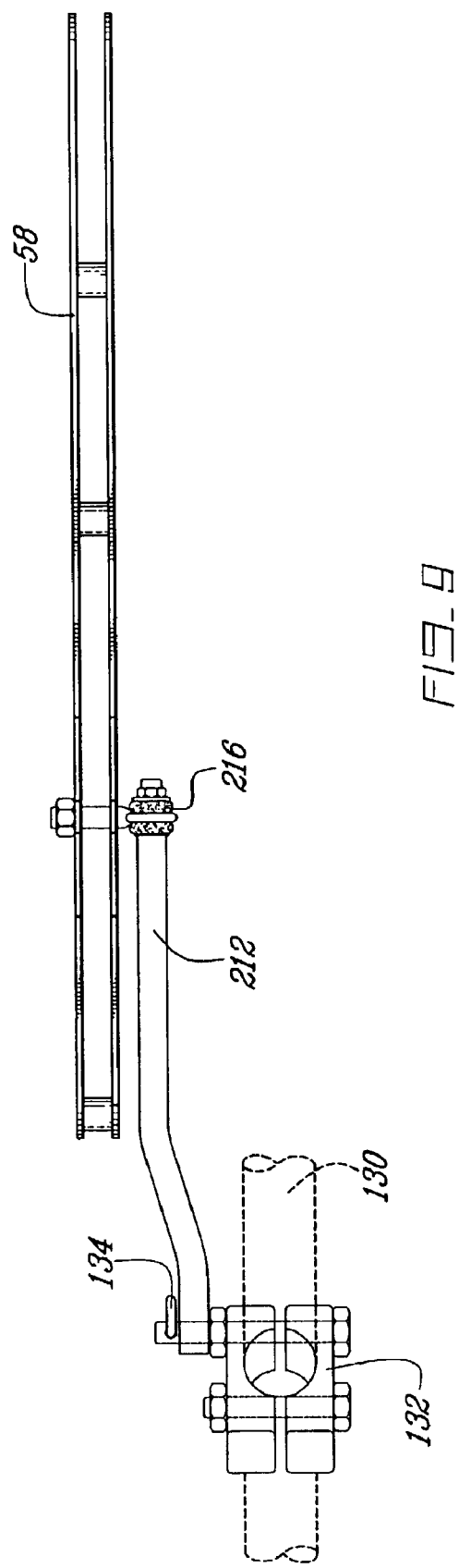
FIG. 9 is a top plan view of the attachment of the rear track assembly of FIG. 1 to the all-terrain vehicle.

A track assembly for an all-terrain vehicle according to an embodiment of the present invention will now be described in details with reference to the appended drawings.

FIG. 1 shows an all-terrain vehicle 10 comprising a body 12 and four track assemblies (only two shown) according to the present invention arranged in a plane adjacent to each side of the vehicle 10.

There are two identical track assemblies in the front of the all-terrain vehicle 10, of which only one track assembly 14 is visible in FIG. 1, in place of conventional front wheels. Similarly, there are two identical track assemblies, of which only one track assembly 16 is visible in FIG. 1, in place of the conventional rear wheels.

Only the track assemblies 14 and 16 visible in FIG. 1 will be described hereinbelow. Furthermore, as they are symmetrical about a vertical axis 22 when viewed from the outside of the vehicle 10 (see FIG. 1), only the track assemblies 14 will be described hereinbelow. It is also to be noted that the elements as seen from the outside of the vehicle 10 will bear the same numbers in the rear track assembly 16 than the corresponding ones in the front track assembly 14, with a prime.

However, since the attachment of rear and front track assemblies differs as seen from the inside of the vehicles 10, they will be described separately.

The front track assembly 14 is better seen in FIG. 2. It comprises a longitudinal endless track belt 23 and a mounting structure to mount the endless track belt 23 to the vehicle 10. The mounting structure includes a track driving wheel 24, a pair of inside idler wheels 26, a pair of outside idler wheels 28 and supports to interconnect the wheels 24, 26 and 28 as will be described hereinbelow.

The endless track belt 23 is provided with inner lugs 30 on its inner surface 31 and with external lugs 32 on its outer surface 33. It is wounded around the track driving wheel 24 and the idler wheels 28 and 26.

As can be better seen from FIG. 4, the track driving wheel 24 is mounted to a conventional hub 35 of the all-terrain vehicle 10. The wheel 24 includes a first mounting plate 37 mounted to the hub 35 and a second mounting plate 34 mounted to the first plate 37 via four bolt and spacer assemblies 36. A circular disk 38 is mounted to the bolt and spacer assemblies 36 and includes equidistant wide teeth 40 contacting the inner surface 31 of the track 23.

As will be apparent to one skilled in the art, the equidistant teeth 40 are so located as to cooperate with some of the inner lugs 30 of the endless track belt 23. More precisely, as can be better seen from FIG. 2, the teeth 40 are spaced so that the distance between two consecutive teeth 40 spans the distance separating consecutive inner lugs 30 of the endless track belt 23, in a meshing engagement, in such a way as to drive the endless track belt 23.

Each of the inside idler wheels 26 includes a peripheral portion in contact with the internal surface 31 of the track 23. The wheels 26 are interconnected by a spacing element (not shown).

Similarly, each outer idler wheel 28 includes a peripheral portion in contact with the internal surface 31 of the track 23. The wheels 28 are interconnected by a spacing element 42.

The wheels 24, 26 and 28 are interconnected, as seen from the outside of the track assembly 14, by an angled connecting element 44. The angled connecting element 44 has a center portion 46 provided with an aperture 48 in which bearings 50 are mounted. A fastener 52 connects the connecting element 44 to the second plate 34 while allowing the angled connecting element 44 to pivot about the fastener.

The connecting element 44 has a short arm 54 having a free end to which the inside idler wheels 26 are rotatably mounted. The connecting element 44 also has a long arm 56 having a free end to which the inside idler wheels 28 are rotatably mounted as will be further discussed hereinbelow. The connecting element 44 is better seen from the top plan view of FIG. 6.

Turning now briefly to FIG. 3 of the appended drawings, as can be seen from the inside of the all-terrain vehicle 10, the idler wheels 26 and 28 of the front track assembly 14 are also directly connected together by an elbowed connection element 58. The inside idler wheels 26 are rotatably mounted to a first end of the elbowed connection element 58 while the outside idler wheels 28 are rotatably mounted to a second end of the elbowed connection element 58.

The rotatable connection of the outside idler wheels 28 to the angle connection element 44 and to the elbowed connection element 58 will now be described with reference to FIG. 5.

As will easily be understood by one skilled in the art upon inspection of FIG. 5, the tension of the endless track belt 23 is adjusted by the connection of the outside idler wheels 28 to the elements 44 and 58. For concision purpose, only the connection of the wheels 28 to the elbowed connection element 58 will be described.

With reference to the enlarged side view of FIG. 5, a tension adjusting assembly according to another aspect of the present invention will be described. As can be seen from this figure, a distal end of the connection element 58 includes a slotted aperture 60 receiving a fastener 62 used to rotatably mount the wheels 28 to the assembly. By sliding the fastener 62 in the aperture 60, it is possible to increase or decrease the tension on the track 23. To adjust and maintain this track tension, a cam element 64, having an outer periphery provided with notches 66 located at different distances from the attachment point of the element 64, is mounted to the fastener 62. By selecting which notch 66 is in contact with a fixed pin 68 of the element 58, a predetermined tension may be maintained. It is to be noted that the cam element 64 is provided with a handle 70 to facilitate the manipulation by a user.

Returning to FIG. 4 of the appended drawings the endless track 23 will be described in greater detail.

As can be seen from FIG. 4, the overall profile of the track 23, from one side to the other, i.e. transversely, is generally convex. However, the convex profile of the track 23 is created by a lug arrangement comprising two successive transverse rows of lugs arranged in a staggered relationship.

A first transverse row of lugs contains three lugs 72, 74 and 76 and a second row of lugs contains four lugs 78, 80, 82 and 84. These lugs are symmetrical about a longitudinal axis (not shown).

A first lateral lug 72 of the first row includes three ground-contacting surfaces separated by two indentations. The shape of lateral lug 72 is such that the ground contacting surfaces are generally transversally convex.

A central lug 74 is centered about longitudinal axis and includes two ground-contacting surfaces separated by an indentation. The ground contacting surfaces are symmetrical about the longitudinal axis and are generally transversally convex.

A second lateral lug 76 is a mirror image of lug 72 about the longitudinal axis.

The first and second lateral lugs 72 and 76 are laterally spaced apart from the central lug 74.

In the second transverse row of lugs, a first intermediate lug 80 includes two ground-contacting surfaces separated by an indentation. The ground engaging surfaces are slightly transversally convex.

A first external lug 78 includes two ground-contacting surfaces that are separated by an indentation and are transversally convex.

Finally, the second intermediate lug 82 and the second external lug 84 are respectively mirror images of lugs 80 and 78 with respect to the longitudinal axis. For concision purposes, these lugs will not be further described herein.

Of course, the sequences described hereinabove of the lug arrangement defined by the rows of lugs are repeated onto the entire external surface of the endless track 23.

The endless track belt 23 further includes, for each row of lugs, a stiffening rod 71, made of glass fibers for example. Each stiffening rod 71 is embedded in the material forming the track belt 23 so as to be generally parallel to the inner surface 31 thereof. The rods 71 provide enhanced rigidity to the endless track belt 23. The enhanced rigidity of the track belt 23 has many advantages. For example, it helps the track to provide adequate traction even when the center portion of the track is not in direct contact with the ground, as illustrated in FIG. 4. However, it has been found that this type of traction may be detrimental to the steering of the vehicle in some conditions.

As it is apparent from FIG. 4 the ground contacting surfaces of symmetrical lugs 78 and 84 are not aligned with the outer surfaces of the other lugs to form a continuous profile. Indeed, the ground contacting surfaces of lugs 78 and 84 are more angled and exceed the convex profile defined by the other lugs. This configuration of the outer lugs is advantageous since it further prevents the vehicle from tipping over during sharp turns at high speed when the vehicle 10 is severely tilted.

As mentioned hereinabove, the way the front track assembly 14 is attached to the body 12 of the vehicle 10 differs from the way the rear track assembly 16 is attached to the body 12 of the vehicle 10. These two attachments will be described hereinbelow.

The front track assembly 14 is attached to the body 12 of the vehicle 10 in a fashion shown in FIGS. 4 and 7, while the rear track assembly 16 is attached to the body 12 of the vehicle 10 in a fashion shown in FIGS. 8 and 9.

As seen in FIGS. 4 and 7, the front track assembly 14 is mounted to a tubular wheel table 100 of the vehicle 10 by means of a generally triangular plate 102 fastened thereto by a plurality of U-bolts 104, 106, 108 and 110. A rod 112 is connected between the elbowed connection element 58 and a pivot 114 of the tubular wheel table 100. A first end of the rod 112 is attached to the elbowed connection element 58 by means of rubber damping elements 116, in such a way as to allow a vertical movement at this point of the rod 112 in relation to the elbowed connection element 58. A second end of the rod 112 is attached to the pivot 114 of the tubular wheel table 100 by means of an R-clip 120, in such a way as to allow at this point a horizontal movement of the plate 102 holding the tubular wheel table 100 relative to the elbowed connection element 58.

The front track assembly 14 is further attached to the body 12 of the vehicle 10 through a conventional rod 150 of the suspension system of the vehicle 10 and a conventional rod 157 used for direction (see FIG. 4).

As seen in FIGS. 8 and 9, the rear track assembly 16 is mounted to the body 12 of the vehicle 10 by a rod 212. The rod 212 is connected on a first end to the elbowed connection element 58' by means of a rubber damping attachment 216. It is attached, on a second end, to a tubular chassis 130 of the body 12 of the vehicle 10 by means of a chipping joint 132 fastened thereto by an R-clip 134.

From the above description of the fashion in which the front and rear track assemblies 14 and 16 are mounted to the body 12 of the vehicle 10, in relation to FIGS. 4 and 7, and 8 and 9 respectively, the present invention provides for track assemblies that are easily removed or mounted to the vehicle 10, through using R-clips (120 and 134), which enable disconnecting the track assemblies from the vehicle in a simple manner.

As stated hereinabove, the interior surface 31 of the endless track belt 23 is provided with a plurality of equally spaced lugs 30, which ensure a positive engagement with the teeth 40 provided on the outer circumference of the wheel 24. In operation, the wheel 24 is coupled to a drive shaft, via the hub 30, connected to an engine (not shown), in such a way that the engine drives the wheel 24 in rotation. The wheel 24 thus drives the endless track belt 23 by the meshing engagement of the teeth 40 with the internal lugs 30 of the endless track belt 23.

It is further to be understood that the external lugs 32 on the external circumference surface of the endless track belt 23 respectively exert a positive mechanical connection with the underlying ground surface that contributes to propel the vehicle 10.

Figure 10:
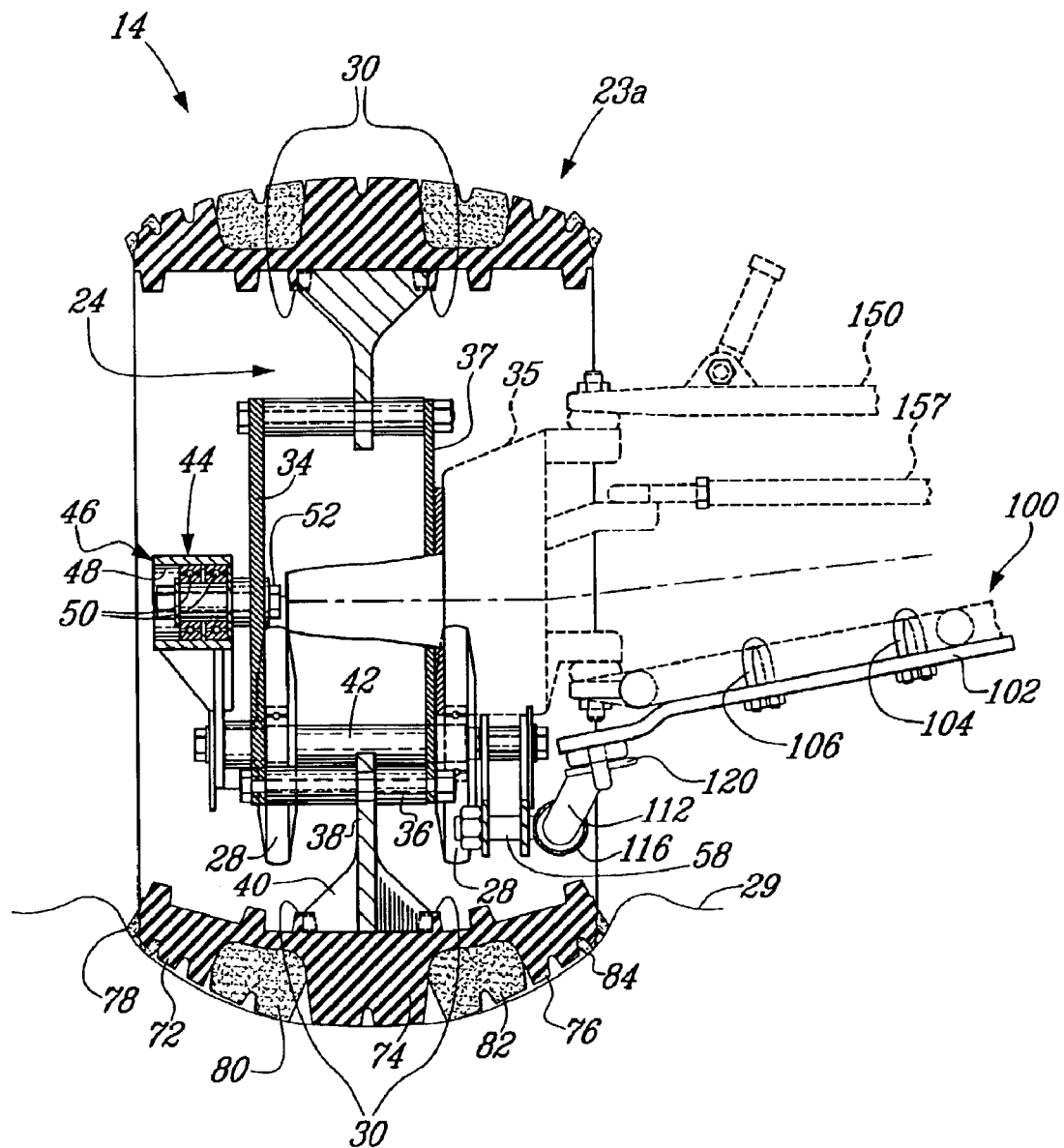
FIG. 10 is a sectional view similar to FIG. 4 but illustrating a second type of endless track.

FIG. 10 and FIG. 11 show sectional views similar to that of FIG. 4 but illustrating variants of an endless track that may be mounted to the track assembly of the present invention.

In FIG. 10, the overall profile of the endless track belt 23a, from one side to the other, i.e. transversely, is generally convex.

The convex profile of the endless track belt 23a is created by the same lug arrangement as that described hereinabove in relation to FIG. 4. In this specific embodiment however, the endless track belt 23a does not include stiffening rods under each row of lugs. Consequently, the rigidity of the endless track belt 23a is less than the rigidity of the endless track belt 23 (FIG. 4) and the profile of the endless track belt 23a conforms itself to the profile of the ground. Since the pressure is more localized in the center of the endless track belt 23a, a more punctually localized contact zone between the endless track belt 23a and the ground 29 is created. In many cases, this punctually localized contact zone makes the vehicle 10 more maneuverable.

Turning now to FIG. 11, a third version of an endless track belt 23b will be described. The endless track belt 23b is wounded around the track driving wheel 24 and the idler wheels 28 and 26, is still provided with inner lugs 30 on its inner surface 31. However, its outer surface is provided with rectangular lugs 86. Since there are no stiffening rods in the endless track belt 23b, the endless track belt 23b is free to conform itself to the ground 29, as seen in FIG. 11. Furthermore, since the pressure is exerted only in the middle of the endless track belt 23b by the wide teeth 40, a punctually localized contact zone between the endless track belt 23b and the ground 29 is created.

As will be apparent to one skilled in the art, the endless track belts 23a has a particularly punctually localized contact surface with the ground 29. Indeed, since it is transversally convex, it generally contacts the ground 29 with a limited surface at any given time when the ground 29 is hard.

Furthermore, since there are no guiding rails for the endless track belts 23, 23a or 23b, the external lugs only exert a pressure on the ground 29, when it is hard, in the vicinity of the wide teeth 40 if the wheel 24. Referring to FIGS. 1, 2, 3, and 8, it will be seen that the peripheral portion of the track driving wheel 24 in contact with the lower portion of the endless track belt 23 is below the peripheral portion of the idler wheels 26, 28. Therefore, on flat ground surfaces, only a punctually localized surface of endless track belt 23, under the track driving wheel; 24, is in contact with ground 29. Even on uneven ground surface, the contact surface is reduced since only a portion of the endless track belt 23 is in contact with ground 29. These three combined features improve the maneuverability of the vehicle since it emulates the contact of a conventional tire onto hard ground, given that a shortened length of contact of the endless track with the ground surface reduces the resistance to a turning force.

Of course, one skilled in the art could designed another convex profile of the external lugs of the endless track belts 23 and/or another arrangement of the mounting assembly of the endless track belts 23 to the vehicle 10 to obtain this "one point contact" feature without departing from the spirit and nature of the present invention. For example, one could provide a guiding rail having a convex profile and transversally convex lugs to achieve similar results.

As people in the art will understand, the all-terrain vehicle of the present invention, provided with four endless track assemblies, can be used for a wide range of operations and terrain, while being highly mobile and offering good running performance.

The endless track structure maintains an adequate configuration over a variety of surfaces.

It will be obvious to people skilled in the art that the present invention can be applied both in the case of a two-wheel drive vehicle wherein the power is typically applied only to the rear track belt assemblies and the front track assemblies merely facilitate steering, and in the case of a four-wheel vehicle, wherein power is independently provided to each one of the four track assemblies.

As will be further understood by one skilled in the art, the all-terrain vehicle 10, equipped with track assemblies according to the present invention, may be viewed as a snow vehicle since it may be used on snow as efficiently as conventional snow vehicles such as snowmobiles, for example. However, the one-point contact feature of the present invention allows the use of the all-terrain vehicle on harder surface without the usual drawbacks of tracked vehicles.

Interestingly, the present track assembly system can equip all four wheels of an all-terrain vehicle or only the front or rear wheels thereof, since it only weakly reduces the speed of the vehicle relative to the underground surface.

A further possibility would be to use track assemblies according to the present invention in place of the rear wheels of a vehicle, while mounting skis in place of the front wheels thereof.

Although the present invention has been described hereinabove by way of preferred embodiments thereof, it can be modified, without departing from the spirit and nature of the subject invention as defined in the appended claims.

What is claimed is:

1. An all-terrain vehicle comprising at least two track assemblies to support the all-terrain vehicle onto a ground surface, each one of said at least two track assemblies comprising:

a longitudinal endless track belt provided with an inner surface provided with a plurality of inner lugs and an outer surface provided with a plurality of external lugs;

a track driving wheel having a peripheral portion, said track driving wheel being operatively engaged with said endless track belt to drive said endless track belt;

at least one inside idler wheel and at least one idler outside wheel, each having a peripheral portion in contact with said endless track belt, said endless track belt being wounded around said track driving wheel, said at least one inside idler wheel, and said at least one outside idler wheel; and a mounting structure to mount said track driving wheel, said at least one inside idler wheel, and said at least one outside idler wheel to said vehicle, said mounting structure has an interconnecting arm between said track driving wheel and said idler wheels, said interconnecting arms includes an angled connecting element provided with a short arm having a free end to which said at least one inside idler wheel is rotatably mounted and a long arm having a free end to which said outside idler wheel is rotatably mounted, the peripheral portion of said track driving wheel in contact with the lower portion of said endless track belt being below the lower peripheral portion of said idler wheels in contact with said endless track belt;

whereby, when said vehicle is disposed on a flat surface only a portion of said endless track belt under said track driving wheel is in contact with said flat surface.

2. The all-terrain vehicle according to claim 1, wherein said longitudinal endless track belt has an overall transversal profile generally convex.

3. The all-terrain vehicle according to claim 2, wherein said longitudinal endless track belt further include at least one transversal stiffening rod.

4. The all-terrain vehicle according to claim 3, wherein said stiffening rod includes fiber glass material.

5. The all-terrain vehicle according to claim 2, wherein said plurality of external lugs form a lug arrangement comprising at least two successive transverse rows of lugs arranged in a staggered relationship.

6. The all-terrain vehicle according to claim 5, wherein said lug arrangement comprises a first row of lugs and a second row of lugs, said first row of lugs being arranged in a first sequence comprising a first lateral lug, a central lug and a second lateral lug; said second row of lugs being arranged in a second sequence comprising a first intermediate lug, a first external lug and a second intermediate lug.

7. The all-terrain vehicle according to claim 1, wherein said track driving wheel is provided with equidistant teeth contacting the inner surface of the endless track belt, said teeth being so located as to cooperate in a meshing engagement with said inner lugs of the endlesss track belt.

8. The all-terrain vehicle according to claim 7, wherein said track driving wheel includes a first mounting plate and a second mounting plate mounted thereto by a bolt and spacer assembly supporting said teeth.

9. The all-terrain vehicle according to claim 1, wherein said track driving wheel is mounted to a hub of the all-terrain vehicle.

10. The all-terrain vehicle according to claim 1, wherein said at least one interconnecting arm further includes an elbowed connection element interconnecting said inside idler wheel and said outside idler wheel, whereby said inside idler wheel is rotatably mounted to a first end of said elbowed connection element while said outside idler wheel is rotatably mounted to a second end thereof.

11. The all-terrain vehicle according to claim 10, wherein said endless track belt is under a tension that may be adjusted by a tension adjusting assembly mounted to said at least one interconnecting arm.

12. The all-terrain vehicle according to claim 11, wherein said tension adjusting assembly includes: a cam element rotatably and slidably mounted to a slotted aperture of said at least one interconnecting arm; and a pin fixedly mounted to said at least one interconnecting arm to contact the cam element; wherein one of said inside and outside idler wheels is so rotatably mounted to said cam elements as to be moved by a rotation of said cam element, thereby adjusting the tension of said endless track belt.

* * * * *